US012664094B2

(12) United States Patent
Perry

(10) Patent No.: US 12,664,094 B2
(45) Date of Patent: Jun. 23, 2026

(54) MEMORY COHERENCE WITH EARLY STORE COMPLETION

(71) Applicant: Ampere Computing LLC, Santa Clara, CA (US)

(72) Inventor: Jonathan Perry, Portland, OR (US)

(73) Assignee: Ampere Computing LLC, Santa Clara, CA (US)

( * ) Notice: Subject to any disclaimer, the term of this patent is extended or adjusted under 35 U.S.C. 154(b) by 0 days.

(21) Appl. No.: 18/933,996

(22) Filed: Oct. 31, 2024

(65) Prior Publication Data

US 2026/0119400 A1    Apr. 30, 2026

(51) Int. Cl.
*G06F 12/0815* (2016.01)
*G06F 12/0806* (2016.01)
*G06F 12/0891* (2016.01)

(52) U.S. Cl.
CPC ...... *G06F 12/0815* (2013.01); *G06F 12/0806* (2013.01); *G06F 12/0891* (2013.01)

(58) Field of Classification Search
None
See application file for complete search history.

(56) References Cited

U.S. PATENT DOCUMENTS

| | | | |
|---|---|---|---|
| 7,502,892 B2 * | 3/2009 | Hammarlund | G06F 9/3834 711/138 |
| 2002/0147889 A1 * | 10/2002 | Kruckemyer | G06F 12/0831 711/144 |
| 2002/0174305 A1 * | 11/2002 | Vartti | G06F 12/0815 711/145 |
| 2003/0204679 A1 * | 10/2003 | Blankenship | G06F 12/0835 711/146 |
| 2005/0198437 A1 * | 9/2005 | Mukherjee | G06F 12/0859 711/E12.051 |
| 2011/0055530 A1 * | 3/2011 | Henry | G06F 9/30043 712/E9.033 |
| 2015/0220440 A1 * | 8/2015 | Aga | G06F 12/0835 711/141 |
| 2020/0065006 A1 * | 2/2020 | Yen | G06F 3/0673 |
| 2022/0261351 A1 * | 8/2022 | Vasudevan | G06F 3/068 |
| 2024/0330185 A1 * | 10/2024 | King | G06F 12/0815 |

* cited by examiner

*Primary Examiner* — Kaushikkumar M Patel
(74) *Attorney, Agent, or Firm* — Muncy, Geissler, Olds & Lowe, P.C.

(57) ABSTRACT

In an aspect, an apparatus comprises a writer agent, wherein the writer agent may obtain exclusive access to at least one coherence granule of shared memory with respect to one or more other agents. The writer agent may mark, at the writer agent, completion of a store of the at least one coherence granule prior to receipt of data for the at least one coherence granule from the shared memory. The writer agent may receive the data from the shared memory for the at least one coherence granule. The writer agent may store the data at a local cache of the writer agent. The writer agent may modify the data at the writer agent.

22 Claims, 4 Drawing Sheets

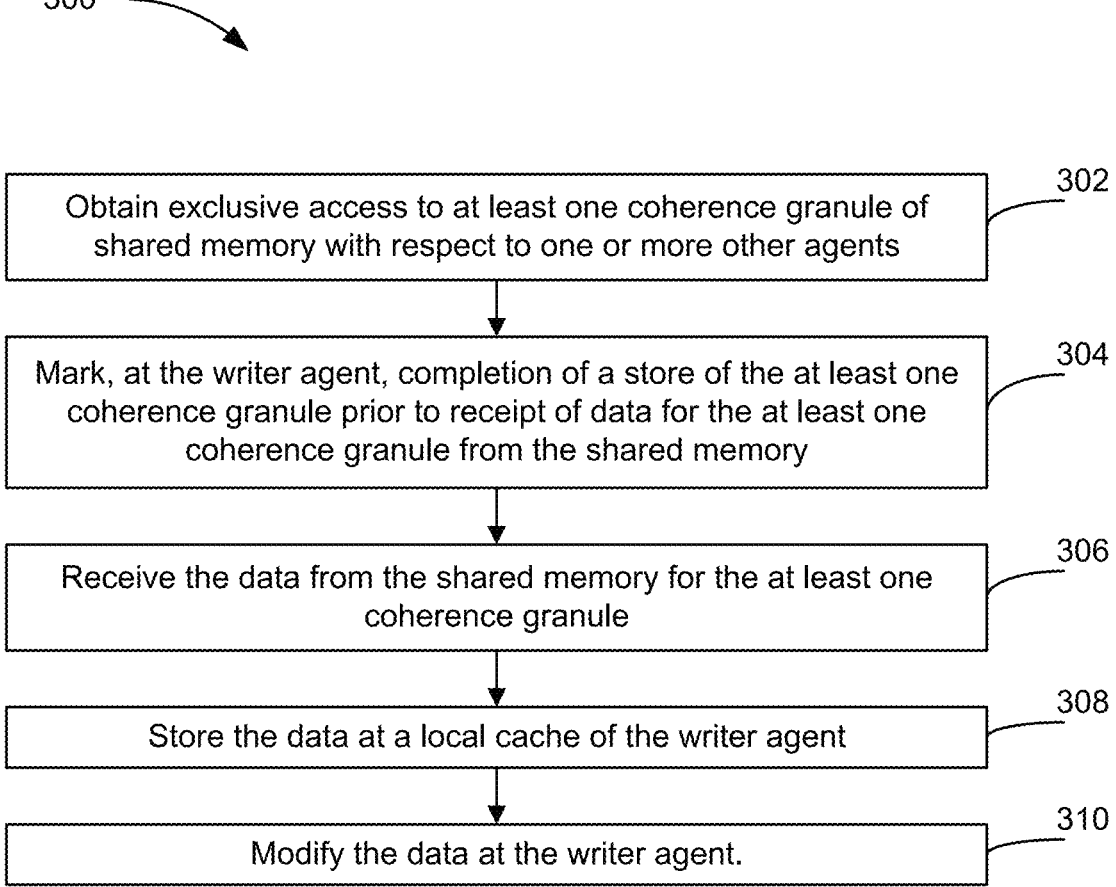

300

302
Obtain exclusive access to at least one coherence granule of shared memory with respect to one or more other agents 304
Mark, at the writer agent, completion of a store of the at least one coherence granule prior to receipt of data for the at least one coherence granule from the shared memory 306
Receive the data from the shared memory for the at least one coherence granule 308
Store the data at a local cache of the writer agent 310
Modify the data at the writer agent.

FIG. 3

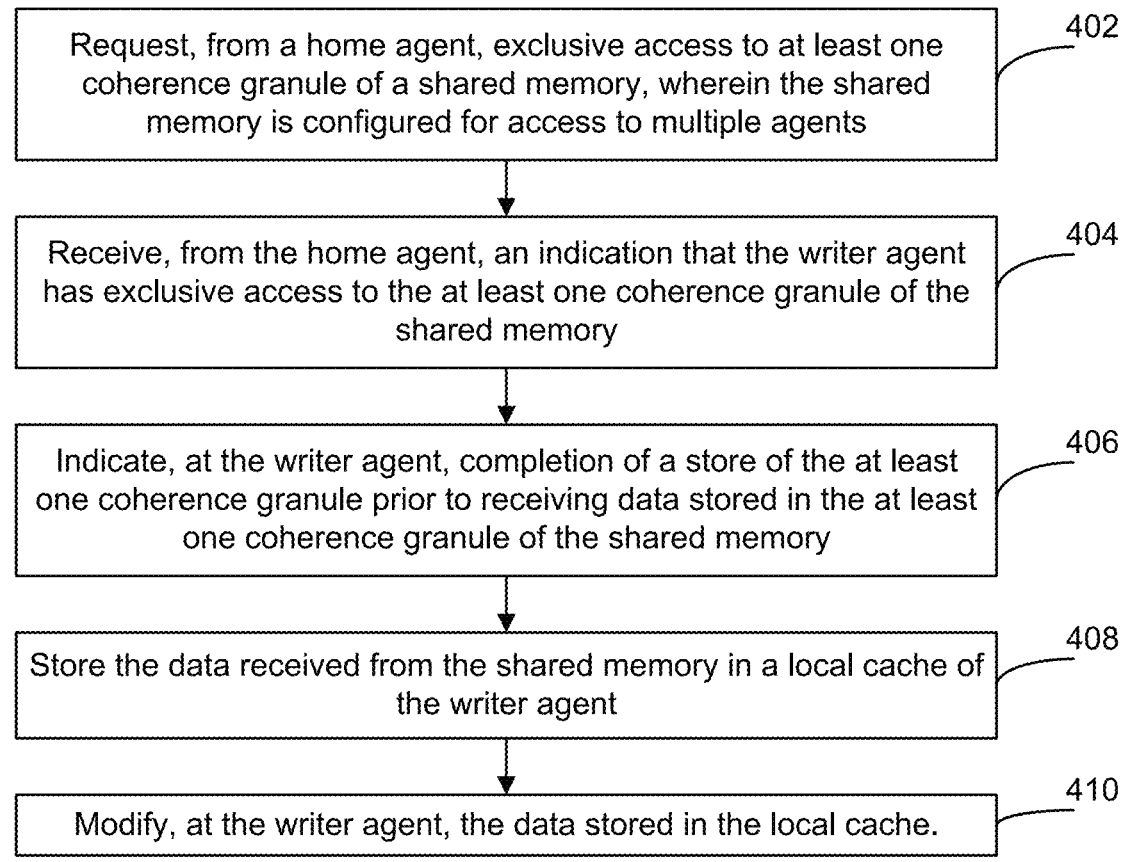

400

402
Request, from a home agent, exclusive access to at least one coherence granule of a shared memory, wherein the shared memory is configured for access to multiple agents 404
Receive, from the home agent, an indication that the writer agent has exclusive access to the at least one coherence granule of the shared memory 406
Indicate, at the writer agent, completion of a store of the at least one coherence granule prior to receiving data stored in the at least one coherence granule of the shared memory 408
Store the data received from the shared memory in a local cache of the writer agent 410
Modify, at the writer agent, the data stored in the local cache.

FIG. 4

MEMORY COHERENCE WITH EARLY STORE COMPLETION

BACKGROUND OF THE DISCLOSURE

1. Field of the Disclosure

Aspects of the disclosure relate generally to memory coherence. More specifically, the disclosure relates, but not exclusively, to early store completion in maintaining memory coherence.

2. Description of the Related Art

In a multi-processor system, multiple processors may access and modify the same memory location. Memory coherence ensures that all processors have a consistent view of the memory. For example, if one processor updates a value in memory, all other processors should see that updated value rather than an outdated one.

When processors use caches to store frequently accessed data, maintaining memory coherence becomes challenging. Different processors might have different cached copies of the same memory location. Cache coherence protocols ensure that any changes made to the cached data by one processor are reflected across all other caches, keeping the data consistent.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method executed by a writer agent to maintain memory coherence includes obtaining exclusive access to at least one coherence granule of shared memory with respect to one or more other agents; marking, at the writer agent, completion of a store of the at least one coherence granule prior to receipt of data for the at least one coherence granule from the shared memory; receiving the data from the shared memory for the at least one coherence granule; storing the data at a local cache of the writer agent; and modifying the data at the writer agent.

In an aspect, a method executed by a writer agent to maintain memory coherence includes requesting, from a home agent, exclusive access to at least one coherence granule of a shared memory, wherein the shared memory is configured for access to multiple agents; receiving, from the home agent, an indication that the writer agent has exclusive access to the at least one coherence granule of the shared memory; indicating, at the writer agent, completion of a store of the at least one coherence granule prior to receiving data stored in the at least one coherence granule of the shared memory; storing the data received from the shared memory in a local cache of the writer agent; and modifying, at the writer agent, the data stored in the local cache.

In an aspect, an apparatus includes a writer agent, wherein the writer agent is configured to: obtain exclusive access to at least one coherence granule of shared memory with respect to one or more other agents, wherein the shared memory is configured for access by the one or more other agents; mark completion of a store of the at least one coherence granule prior to receipt of data for the at least one coherence granule from the shared memory; receive the data from the shared memory for the at least one coherence granule; storing the data received from the shared memory at a local cache of the writer agent; and modifying the data at the writer agent.

In an aspect, a writer agent includes means for obtaining exclusive access to at least one coherence granule of shared memory with respect to one or more other agents; means for marking, at the writer agent, completion of a store of the at least one coherence granule prior to receipt of data for the at least one coherence granule from the shared memory; means for receiving the data from the shared memory for the at least one coherence granule; means for storing the data at a local cache of the writer agent; and means for modifying the data at the writer agent.

In an aspect, a non-transitory computer-readable medium stores computer-executable instructions that, when executed by a writer agent, cause the writer agent to: obtain exclusive access to at least one coherence granule of shared memory with respect to one or more other agents; mark, at the writer agent, completion of a store of the at least one coherence granule prior to receipt of data for the at least one coherence granule from the shared memory; receive the data from the shared memory for the at least one coherence granule; store the data at a local cache of the writer agent; and modify the data at the writer agent.

Other objects and advantages associated with the aspects disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings, which are presented solely for illustration and not limitation of the disclosure.

FIG. 3 is a flowchart showing an example method that may be executed by a writer agent to maintain memory coherence, according to aspects of the disclosure.

FIG. 4 is a flowchart showing another example method that may be executed by a writer agent to maintain memory coherence, according to aspects of the disclosure.

DETAILED DESCRIPTION

Figure 1:
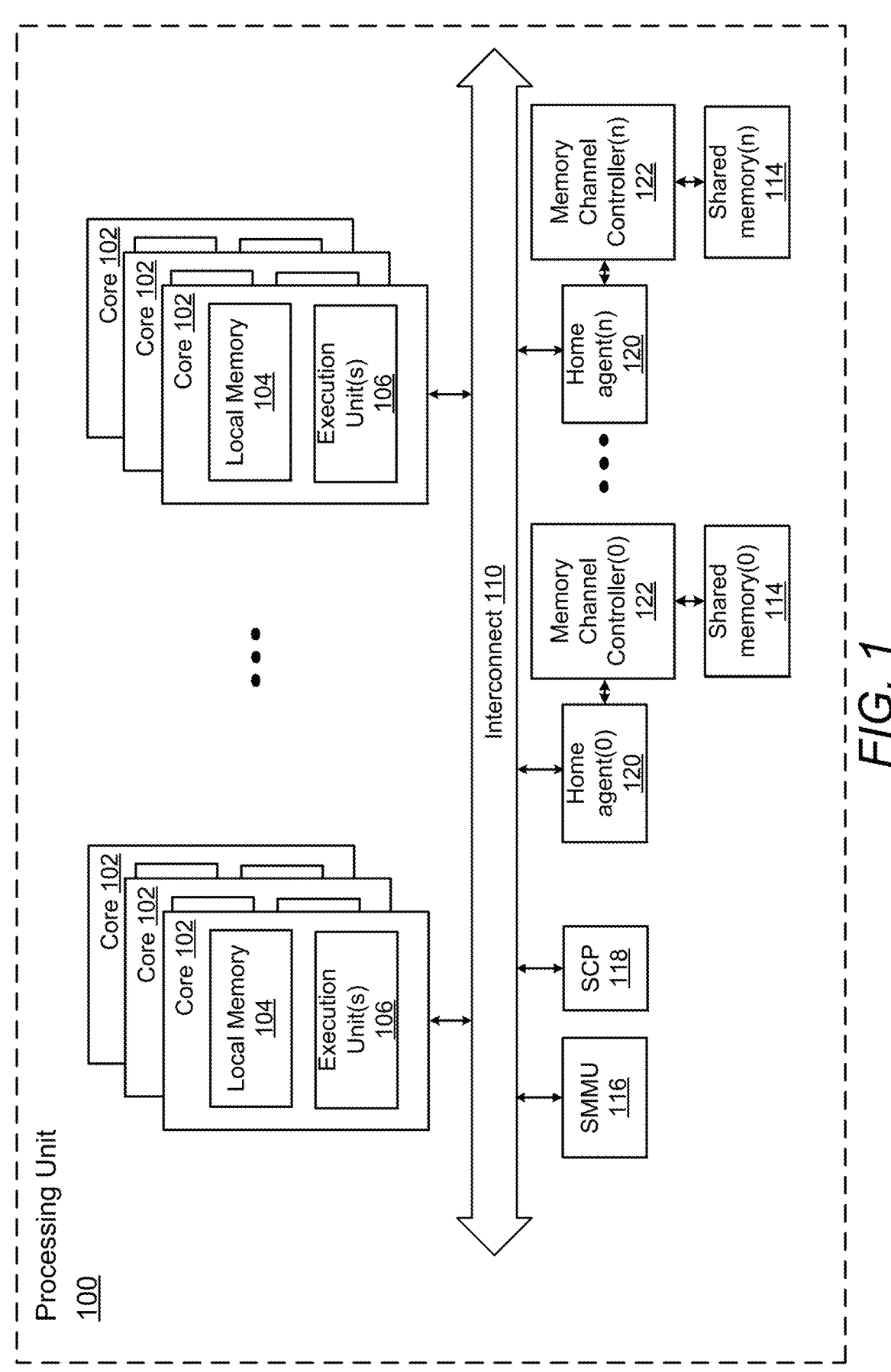
FIG. 1 illustrates an example of a processing unit, according to aspects of the disclosure.

Other objects and advantages associated with the aspects disclosed herein will be apparent to those skilled in the art based on the accompanying drawings and detailed description. In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

Various aspects of the subject technology relate to structures and techniques for maintaining memory coherence in a processing system. Maintaining memory coherence in multi-processor systems, multiple core systems, multiple agent systems, etc. (collectively, multiple agent systems) involves several operations designed to ensure that all agents have a consistent view of memory. These operations are important in systems where multiple agents can access and modify the data in shared memory.

In accordance with aspects of the disclosure, the units of data stored in the shared memory may be considered in terms of a "cache line" and/or a "coherence granule." In an aspect, the term "cache line" may be used to broadly reference the fundamental unit of data storage in a cache, used in any system with a cache, whether the system is a single processor or a multi-core/multi-processor system. In an aspect, the term "coherence granule" may be used with reference to the fundamental unit of data storage in the context of a multi-core or multi-processor system, where multiple agents might cache the same data and consistency between caches must be enforced. In an aspect, a coherence granule refers to the smallest block of data for which cache coherence is maintained across multiple processors or caches in a multi-processor or multi-core system. The coherence granule may be the same size as a cache line but is specific to maintaining consistency in shared memory systems (e.g., the coherence granule may be smaller than the size of the cache line, such as one byte). In the following disclosure, the term "cache line" may include an entire cache line or a coherence granule smaller than the entire cache line.

Memory coherence in multi-processor/multi-agent systems relies on establishing an ordering of reads and writes to a given memory address, such that all agents agree on the value of the data stored at the given memory address at a given time (e.g., the data at a given memory address is updated as necessary to reflect changes to other copies of the same memory address, so that no agent performs operations on a non-updated copy). However, maintaining memory coherence on shared data may be costly in terms of hardware and processing time. Passing data between agents (e.g., central processing units, processing cores, etc.) incurs a performance penalty compared to operating on private and/or local data at the agent. Certain aspects of the disclosure are implemented to reduce the performance penalty for implementing memory coherence in common use cases.

A store (write) is considered complete (coherent) at the point where any reader (e.g., agent) of the memory location will see the same stored value (e.g., the same value stored in the coherence granule). Many possible coherence flows may be used to maintain memory coherence. One such coherence flow is based on the following operations:

1) An agent desiring to modify data (writer agent) requests ownership of a cache line of shared memory from a point of coherence (POC);

2) The POC sends an acknowledgment to the writer agent that the writer agent has been given exclusive access to the cache line (e.g., the writer agent is the only agent that is allowed to access and/or modify the cache line);

3) The POC directs a memory controller to read the cache line from shared memory and return the data to the writer agent;

4) The writer agent receives the cache line data and stores it in a local cache at the writer agent;

4) The writer agent modifies its cached copy of the data of the cache line; and

5) The modified data is written to the shared memory in a write-back operation.

Certain aspects of the disclosure are implemented with the recognition that the latency associated with the provision of the data of the cache line from the shared memory to the writer agent is greater than the latency associated with the request for exclusive ownership of the cache line from the writer agent to the home agent and the grant of the request by the home agent. Certain aspects of the disclosure are implemented with a further recognition that the writer agent cannot perform certain processing operations until the writer receives the cache line from the shared memory under the control of the memory controller. Based on these factors, the present disclosure implements memory coherence operations that facilitate processing operations at the writer agent that could not otherwise be executed before receiving the cache line from the shared memory.

FIG. 1 illustrates an example of a processing unit 100 that may implement memory coherence operations, according to aspects of the disclosure. Processing unit 100 may be configured as a central processing unit (CPU) but may also be used with or configured as other processing units, such as but not limited to a graphics processing unit (GPU) or tensor processing unit (TPU). Processing unit 100 may include a set of processing cores 102 (or simply "cores" 102). Each core 102 may include local memory 104 (e.g., local cache memory) respectively associated with one or more execution units 106. Each core 102 may be coupled to interconnect 110, which may be a system-on-chip (SoC) coherent interconnect. In an aspect, interconnect 110 may be configured as a mesh interconnect that forms a high-speed interface that couples each core 102 to the other cores 102 and other components in processing unit 100. In some examples, local memory 104 may be configured as cache on the core 102 (e.g., 16 kB or 64 kB L1 Instruction-cache, 64 kB L1 Data-cache, and 1 MB or 2 MB level 2 (L2) Cache, in some aspects).

The one or more execution units 106 may perform various operations and calculations associated with instructions and micro-operations of the core 102. The one or more execution units 106 may be configured as various units in the core 102 in accordance with various implementations. For example, the one or more execution units 106 may include arithmetic logic units (ALUs) that perform arithmetic and logic operations for the core 102. The one or more execution units 106 may include floating point units (FPUs) that perform floating point calculations. The one or more execution units 106 may include integer execution units (IXUs) for performing integer operations. The one or more execution units 106 may also include single instruction, multiple data (SIMD) execution units for performing various instructions. In some examples, an execution unit 106 may perform a combination of these and other operations. Each of the one or more execution units 106 may include a bus or interconnect, for example, to connect hardware elements of the execution units 106 to memory 104 to perform read and write functions while executing micro-operations. Additionally, or alternatively, one or more execution units 106 including ALUs, FPUs, IXUs, and/or SIMD execution units may be configured for all or a subset of the cores 102. Processing unit 100 may also include a system memory management unit (SMMU) 116 that, for example, provides translation services to non-processor master units. For example, the SMMU 116 may translate addresses for direct memory address (DMA) requests from system input/output (I/O) devices before the requests are passed to interconnect 110. Processing unit 100 may also include a system control processor (SCP) 118. The SCP 118 may be configured to handle various system management functions. In some examples, the SCP 118 may include separate microcontrollers (or processors). In some examples, the SCP 118 may be combined into one or two microcontrollers or sub-divided into more than two micro-controllers in accordance with various implementations to handle various system management functions.

Processing unit 100 may also include one or more home agents 122 that are connected to the interconnect 110 to handle memory coherence operations associated with memory reads from and memory writes to memory shared by the processing cores 102. In some scenarios, any of the processing cores 102 may operate as a writer agent (e.g., an agent writing data to shared memory) or a reader agent (e.g., an agent reading data from shared memory). Multiple home agents 120 (e.g., home agent(0) through home agent (n)) are employed in the example processing unit 100 shown in FIG. 1. In an aspect, each home agent 120 may be in communication with a corresponding memory channel controller (e.g., memory channel controller(0) through memory channel controller(n)), which may handle transfer of data to and from shared memory 114 (e.g., shared memory(0) through shared memory(n)). In some examples, shared memory 114 may include system-level cache(s) (e.g., 32 MB or 64 MB, in some aspects) that may be used for various purposes by the processing unit 100. In some examples, the shared memory 114 may be implemented as distinct memory devices having memory spaces handled by respective home agents 120 (e.g., home agent(0) manages the address space of shared memory(0), home agent (n) manages the address space of shared memory (n), etc.). In some examples, the shared memory 114 may be implemented as a single memory device having a memory address spaces that is managed by their corresponding home agents As such, in systems having multiple home agents, the responsibility for coherence operations associated with different address spaces of shared memory may be divided between the home agents.

It is to be appreciated that the processing unit 100 of FIG. 1 may be configured according to a monolithic die design or a disaggregated chipset design. For example, in the monolithic die design, the cores 102, interconnect 110, memory 114, SMMU 116, and SCP 118 may be configured on a single die. In some cases, for example, in the disaggregated chipset design, each chipset of multiple disaggregated chipsets may include a subset of the cores 102 (e.g., in a tiled fashion) with a memory controller to control a portion of memory 114, and a peripheral component interconnect (PCI) or PCI express (PCIe) controller to control the interface with interconnect 110, SMMU 116, and/or SCP 118. Additionally, or alternatively, other computer architecture designs may be used in various implementations, given the benefit of the disclosure.

Figure 2:
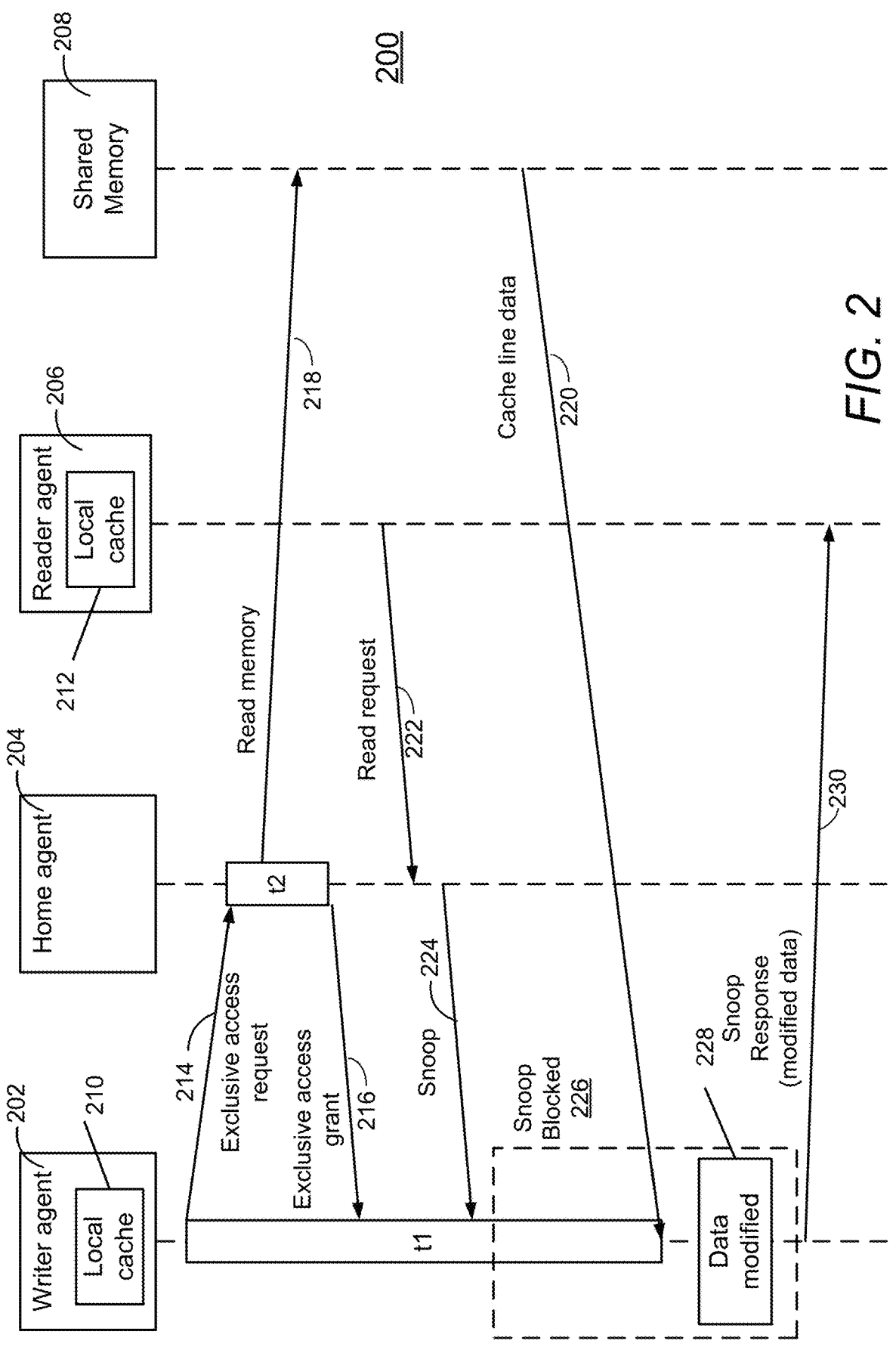
FIG. 2 is a flowchart showing example operations that may be used to maintain memory coherence, according to aspects of the disclosure.

FIG. 2 is a flowchart 200 showing example operations that may be used to maintain memory coherence, according to aspects of the disclosure. Here, the memory coherency operations are implemented based on processes executed by a writer agent 202, a home agent 204, a reader agent 206 (e.g., an agent seeking the same cache line data as the writer agent 202), with respect to shared memory 208. In accordance with aspects of the disclosure, shared memory 208 may be memory storage that is accessible to multiple agents in a multi-agent system. Such shared memory may include system memory, cache storage comment to the agents (e.g., L1 cache, L2 cache, L3 cache, etc.), cache storage that is local to an agent and accessible to one or more other agents (e.g., local cache 210 and 212), or a combination of such memory storage. In this example, such memory storage is collectively shown as shared memory 208 (which in some aspects may also include local cache 210 and 212, although shown separately from shared memory 208).

When the writer agent 202 intends to modify a coherence granule of shared memory 208, the writer agent 202 must first obtain exclusive ownership of that cache line. Accordingly, at operation 214, the writer agent 202 requests ownership of the cache line from the home agent 204. According to aspects of the disclosure, the home agent functions as a PoC. However, it will be recognized, based on the teachings of the present disclosure, that the home agent may be implemented as shown or based on any component type responsible for coordinating exclusive access to cache lines to manage cache coherence in the system. Operation 214 involves the writer agent 202 sending a "read for ownership" request or a similar command to the home agent 204, indicating its intent to modify the cache line stored in shared memory 208.

Upon receiving the ownership request, the home agent 204 evaluates the current state of the cache line across all caches in the system. If the cache line is shared among multiple agents, the home agent 204 initiates invalidation messages to those caches, ensuring that no other processor uses stale data. Once the invalidation is confirmed, the home agent 204 sends an acknowledgment to the writer agent 202 at operation 216, granting the writer agent 202 exclusive ownership of the cache line in the shared memory 208. At this point, the writer agent 202 is the sole agent that can modify the cache line of the shared memory 208.

If the requested cache line is not already present in the writer agent's cache (e.g., local cache 210), the home agent 204 directs a memory controller (not shown) to read the cache data from the shared memory 208 at operation 218, which provides the cache data from the shared memory 208 to the writer agent at operation 220. This operation ensures that the writer agent 202 has the most up-to-date copy of the cache data before making any modifications. The cache data is then stored in the local cache 210 of the writer agent 202 in an exclusive state, meaning no other agent currently holds a valid copy of that cache line.

As shown in flowchart 200, the latency t1 between the time at which the writer agent 202 requests exclusive access to the cache line from shared memory 208 and the time at which the actual cache line data is received from the shared memory is greater than the latency t2 between the time at which the writer agent 202 requests exclusive access to the cache line and the time that it receives exclusive access from the home agent 204. In a conventional memory coherence operation, the writer agent 202 does not execute certain tasks during the time t1. In certain scenarios, a core may be forbidden from completing younger memory operations/instructions, based on the ordering semantics of the instructions sets. For example, in the instruction set architecture (e.g., ISA) of various advanced reduced instruction set machines (e.g., ARM), if there is a barrier between a store and the next memory instruction, the store must be completed before completing the younger instruction. However, it will be recognized that each ISA, such as non-ARM ISAs, may have a different set of forbidden tasks. As such, the forbidden tasks associated with different ISAs may vary from the foregoing and are contemplated to fall within the scope of the present disclosure.

However, to overcome such limitations, the writer agent 202 locally indicates that the store of the cache line has been completed before receipt of the actual data for the cache line at operation 220. In an aspect, the writer agent 202 marks the store as complete to indicate that the local system has fully accepted and processed the write operations. In some scenarios, the store may write only some bytes to the cache line, in which case the write operation merges the old/read data when the data arrives.

By locally indicating that the store is complete at writer agent 202, the latencies associated with some parts of the coherence transaction are effectively hidden to the writer agent 202. Further, the writer agent 202 may execute tasks during time t2 that might otherwise be prohibited or unavailable by architectural semantics. In an aspect, the writer agent 202 may execute further loads or stores to the same memory location before receiving the actual data for the cache line from shared memory 208. Additionally, the writer agent 202 may execute tasks that would otherwise be prohibited or available when a memory fence or barrier is in place. For example, the writer agent 202 may perform operations associated with data stores younger than data stores associated with the cache line for which the writer agent 202 has exclusive access.

After the writer agent 202 receives exclusive access to the cache line and has received the data for the cache line from shared memory 208, the writer agent 202 proceeds to modify its cached copy of the cache line stored in its local cache 210. Since the writer agent 202 has exclusive ownership of the cache line, it can safely modify (e.g., update) the cache data in the local cache 210 without considering conflicts or inconsistencies with other agents. In an aspect, the modified cache data is stored in the local cache 210, and depending on the cache coherence protocol (such as MESI), the cache line might be marked as "Modified" to indicate that the cached data has changed and the data in the shared memory 208 is out of date. When the writer agent 202 modifies its cached copy of the data, the changes are initially stored only in the local cache 210 of the writer agent 202. The cache line is typically marked as "Modified" under cache coherence protocols like MESI (Modified, Exclusive, Shared, Invalid), indicating that the data in the cache is different from the data in the main memory.

The modified cache data is eventually written back to the shared memory through the memory controller, but this does not necessarily happen immediately after the modification. Instead, the write-back may occur when the cache line is evicted (removed) from the shared memory 208 or when the memory controller explicitly flushes the cache line from the shared memory 208 to maintain coherence. In an aspect, the memory controller may coordinate this write-back process to ensure memory coherence is maintained in that the most recent and correct version of the cache line data is stored in shared memory 208.

In certain scenarios, the reader agent 206 may submit a read request to the home agent 204 at operation 222, which submits a snoop to the writer agent 202 at operation 224. The snoop at operation 224 is sent to the writer agent 202 for the purpose of providing the reader agent 206 with the requested cache line data from local cache 210. However, the read request at operation 222 has been submitted before the actual data in the local cache 210 has been modified by the writer agent 202. In this example, the read request at operation 222 was submitted before the actual cache line data was received by the writer agent 202 at operation 220. Accordingly, the local cache 210 includes stale or otherwise invalid data at the time of the snoop operation 224.

Per conventional cache coherence operations, the writer agent 202 normally responds to the snoop by allowing or otherwise making the data in the local cache 210 available to the reader agent 206. As such, the writer agent 202 would immediately respond to the snoop if the store associated with the cache line data has been completed at the writer agent 202. However, if the writer agent 202 immediately responds to the snoop, the reader agent 206 may receive stale and/or invalid data. In accordance with aspects of the disclosure, rather than immediately responding to the snoop, the writer agent 202 blocks the snoop at operation 226 so that the writer agent 202 does not provide the reader agent 206 with the cache line data from the local cache 210 until the writer agent 202 has received the cache line data from the shared memory 208 and modified the data at operation 228. In an aspect, the writer agent 202 may block the snoop at operation 226 by delaying its response to the snoop until the writer agent 202 has modified the cache data in local cache 210. In this example, the data in the local cache 210 is modified at operation 228. Once the writer agent 202 has modified the data in the local cache 210, the writer agent 202 responds to the snoop at operation 230. The writer agent 202 may respond to the snoop in a manner consistent with the particular snoop protocol used in the multi-agent system. In FIG. 2, the writer agent 202 provides the valid cache data now stored in local cache 210 to the reader agent 206. However, in accordance with some snoop protocols, the writer agent 202 may write-back the data from its local cache 210 to shared memory 208, where it will be available to the reader agent 206.

FIG. 3 is a flowchart showing an example method 300 that may be executed by a writer agent to maintain memory coherence, according to aspects of the disclosure. At operation 302, the writer agent obtains exclusive access to at least one coherence granule of shared memory with respect to one or more other agents. At operation 304, the writer agent marks the completion of a store of the at least one coherence granule prior to receipt of data for the at least one coherence granule from the shared memory. At operation 306, the writer agent receives the data from a shared memory with at least one coherence granule. At operation 308, the writer agent stores the data and a local cache of the writer agent. At operation 310, the writer agent modifies the data. In accordance with aspects of the disclosure, the writer agent may include one or more processors that are configured, alone or in combination, to execute instructions that cause the writer agent to perform the foregoing operations.

In accordance with aspects of the disclosure, the example method 300 may be implemented or supplemented by other method operations. In some aspects, the method includes preventing access to the at least one coherence granule at the writer agent by one or more other agents at least until the data has been modified at the writer agent. In some aspects, the shared memory comprises system memory, the cache memory of a common cache, local cache memory of at least one agent of the one or more other agents, or any combination thereof. In some aspects, the data received from the shared memory is obtained under control of a memory controller. In some aspects, the data received from the shared memory is obtained under control of a home agent.

FIG. 4 is a flowchart showing another example method 400 that may be executed by a writer agent to maintain memory coherence, according to aspects of the disclosure. At operation 402, the writer agent requests, from a home agent, exclusive access to at least one coherence granule of a shared memory, wherein the shared memory is configured for access to multiple agents. At operation 404, the writer agent receives, from the home agent, an indication that the writer agent has exclusive access to the at least one coherence granule of the shared memory. At operation 406, the writer agent indicates, at the writer agent, completion of a store of the at least one coherence granule before receiving data stored in the at least one coherence granule of the shared memory. At operation 408, the writer agent stores the data received from the shared memory in a local cache of the writer agent. At operation 410, the writer agent modifies the data stored in its local cache. In accordance with aspects of the disclosure, the writer agent may include one or more processors that are configured, alone or in combination, to execute instructions that cause the writer agent to perform the foregoing operations.

In accordance with aspects of the disclosure, the example method 400 may be implemented or supplemented by other method operations. In some aspects, the method includes receiving, from the home agent, a snoop request for access to the at least one coherence granule in the local cache by at least one agent of the multiple agents and responding to the snoop request only after modifying the data stored in the local cache. In some aspects, the method includes executing, at the writer agent, write operations associated with data stores younger than data stores associated with the at least one coherence granule for which the writer agent has exclusive access. In some aspects, the data received from the shared memory is obtained under control of a memory controller. In some aspects, the data received from the shared memory is obtained under control of the home agent. In some aspects, the data received from the shared memory is obtained from a cache of at least one agent of the multiple agents. In some aspects, the shared memory comprises system memory, cache memory of a common cache, cache memory of at least one agent of the multiple agents, or any combination thereof.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method executed by a writer agent to maintain memory coherence, comprising: obtaining exclusive access to at least one coherence granule of shared memory with respect to one or more other agents; marking, at the writer agent, completion of a store of the at least one coherence granule prior to receipt of data for the at least one coherence granule from the shared memory; receiving the data from the shared memory for the at least one coherence granule; storing the data at a local cache of the writer agent; and modifying the data at the writer agent.

Clause 2. The method of clause 1, further comprising: preventing access to the at least one coherence granule at the writer agent by the one or more other agents at least until the data has been modified at the writer agent.

Clause 3. The method of any of clauses 1 to 2, wherein: the shared memory comprises system memory, cache memory of a common cache, local cache memory of at least one agent of the one or more other agents, or any combination thereof.

Clause 4. The method of any of clauses 1 to 3, wherein: the data received from the shared memory is obtained under control of a home agent.

Clause 5. The method of any of clauses 1 to 4, wherein: the at least one coherence granule has a size smaller than a single cache line.

Clause 6. A method executed by a writer agent to maintain memory coherence, comprising: requesting, from a home agent, exclusive access to at least one coherence granule of a shared memory, wherein the shared memory is configured for access to multiple agents; receiving, from the home agent, an indication that the writer agent has exclusive access to the at least one coherence granule of the shared memory; indicating, at the writer agent, completion of a store of the at least one coherence granule prior to receiving data stored in the at least one coherence granule of the shared memory; storing the data received from the shared memory in a local cache of the writer agent; and modifying, at the writer agent, the data stored in the local cache.

Clause 7. The method of clause 6, further comprising: receiving, from the home agent, a snoop request for access to the at least one coherence granule in the local cache by at least one agent of the multiple agents; and responding to the snoop request only after modifying the data stored in the local cache.

Clause 8. The method of any of clauses 6 to 7, further comprising: executing, at the writer agent, write operations associated with data stores younger than data stores associated with the at least one coherence granule for which the writer agent has exclusive access.

Clause 9. The method of any of clauses 6 to 8, wherein: the at least one coherence granule has a same size as a single cache line.

Clause 10. The method of any of clauses 6 to 8, wherein: the at least one coherence granule has a size smaller than a single cache line.

Clause 11. The method of any of clauses 6 to 10, wherein: the data received from the shared memory is obtained from a cache of at least one agent of the multiple agents.

Clause 12. The method of any of clauses 6 to 11, is wherein: the shared memory comprises system memory, cache memory of a common cache, cache memory of at least one agent of the multiple agents, or any combination thereof.

Clause 13. An apparatus comprising a writer agent, wherein the writer agent is configured to: obtain exclusive access to at least one coherence granule of shared memory with respect to one or more other agents, wherein the shared memory is configured for access by the one or more other agents; mark completion of a store of the at least one coherence granule prior to receipt of data for the at least one coherence granule from the shared memory; receive the data from the shared memory for the at least one coherence granule; storing the data received from the shared memory at a local cache of the writer agent; and modifying the data at the writer agent.

Clause 14. The apparatus of clause 13, wherein: obtaining exclusive access to the at least one coherence granule of the shared memory comprises: requesting, from a home agent, exclusive access to the at least one coherence granule of the shared memory; and receiving, from the home agent, an indication that the writer agent has exclusive access to the at least one coherence granule of the shared memory.

Clause 15. The apparatus of any of clauses 13 to 14, wherein the writer agent is further configured to execute instructions that cause the writer agent to: store the data received from the shared memory in a local cache.

Clause 16. The apparatus of any of clauses 13 to 15, wherein the writer agent is further configured to: receive, from a home agent, a snoop request for access to the at least one coherence granule stored in the local cache by at least one agent of the one or more other agents; and respond to the snoop request only after modifying the data stored in the local cache.

Clause 17. The apparatus of any of clauses 13 to 16, wherein the writer agent is further configured to: perform write operations associated with data stores younger than data stores associated with the at least one coherence granule for which the writer agent has exclusive access.

Clause 18. The apparatus of any of clauses 13 to 17, wherein: the local cache is accessible to at least one of the one or more other agents.

Clause 19. The apparatus of any of clauses 13 to 18, wherein: the writer agent is configured to obtain the data from the shared memory under control of a home agent.

Clause 20. The apparatus of any of clauses 13 to 19, wherein: the shared memory includes one or more local caches at one or more of the other agents.

Clause 21. A writer agent, comprising: means for obtaining exclusive access to at least one coherence granule of shared memory with respect to one or more other agents; means for marking, at the writer agent, completion of a store of the at least one coherence granule prior to receipt of data for the at least one coherence granule from the shared memory; means for receiving the data from the shared memory for the at least one coherence granule; means for storing the data at a local cache of the writer agent; and means for modifying the data at the writer agent.

Clause 22. The writer agent of clause 21, further comprising: means for preventing access to the at least one coherence granule at the writer agent by the one or more other agents at least until the data has been modified at the writer agent.

Clause 23. The writer agent of any of clauses 21 to 22, wherein: the shared memory comprises system memory, cache memory of a common cache, local cache memory of at least one agent of the one or more other agents, or any combination thereof.

Clause 24. The writer agent of any of clauses 21 to 23, wherein: the data received from the shared memory is obtained under control of a home agent.

Clause 25. The writer agent of any of clauses 21 to 24, wherein: the at least one coherence granule has a size smaller than a single cache line.

Clause 26. A non-transitory computer-readable medium storing computer-executable instructions that, when executed by a writer agent, cause the writer agent to: obtain exclusive access to at least one coherence granule of shared memory with respect to one or more other agents; mark, at the writer agent, completion of a store of the at least one coherence granule prior to receipt of data for the at least one coherence granule from the shared memory; receive the data from the shared memory for the at least one coherence granule; store the data at a local cache of the writer agent; and modify the data at the writer agent.

Clause 27. The non-transitory computer-readable medium of clause 26, further comprising computer-executable instructions that, when executed by the writer agent, cause the writer agent to: prevent access to the at least one coherence granule at the writer agent by the one or more other agents at least until the data has been modified at the writer agent.

Clause 28. The non-transitory computer-readable medium of any of clauses 26 to 27, wherein: the shared memory comprises system memory, cache memory of a common cache, local cache memory of at least one agent of the one or more other agents, or any combination thereof.

Clause 29. The non-transitory computer-readable medium of any of clauses 26 to 28, wherein: the data received from the shared memory is obtained under control of a home agent.

Clause 30. The non-transitory computer-readable medium of any of clauses 26 to 29, wherein: the at least one coherence granule has a size smaller than a single cache line.

Any reference herein to an element using a designation such as "first," "second," and so forth does not limit the quantity and/or order of those elements. Rather, these designations are used as a convenient method of distinguishing between two or more elements and/or instances of an element. Also, unless stated otherwise, a set of elements can comprise one or more elements.

Aspects of the present disclosure are illustrated in the description and related drawings directed to specific embodiments. Alternate aspects or embodiments may be devised without departing from the scope of the teachings herein. Additionally, well-known elements of the illustrative embodiments herein may not be described in detail or may be omitted so as not to obscure the relevant details of the teachings in the present disclosure.

The word "exemplary" is used herein to mean "serving as an example, instance, or illustration." Any details described herein as "exemplary" is not to be construed as advantageous over other examples. Likewise, the term "examples" does not mean that all examples include the discussed feature, advantage or mode of operation. Furthermore, a particular feature and/or structure can be combined with one or more other features and/or structures. Moreover, at least a portion of the apparatus described herein can be configured to perform at least a portion of a method described herein.

In certain described example implementations, instances are identified where various component structures and portions of operations can be taken from known, conventional techniques, and then arranged in accordance with one or more exemplary embodiments. In such instances, internal details of the known, conventional component structures and/or portions of operations may be omitted to help avoid potential obfuscation of the concepts illustrated in the illustrative embodiments disclosed herein.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Various components as described herein may be implemented as application specific integrated circuits (ASICs), programmable gate arrays (e.g., FPGAs), firmware, hardware, software, or a combination thereof. Further, various aspects and/or embodiments may be described in terms of sequences of actions to be performed by, for example, elements of a computing device. Those skilled in the art will recognize that various actions described herein can be performed by specific circuits (e.g., an application-specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to, "instructions that when executed perform," "computer instructions to" and/or other structural components configured to perform the described action.

Those of skill in the art further appreciate that the various illustrative logical blocks, components, agents, IPs, modules, circuits, and algorithms described in connection with the aspects disclosed herein may be implemented as electronic hardware, instructions stored in memory or in another computer readable medium and executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, processors, controllers, components, agents, IPs, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Nothing stated or illustrated depicted in this application is intended to dedicate any component, action, feature, benefit, advantage, or equivalent to the public, regardless of whether the component, action, feature, benefit, advantage, or the equivalent is recited in the claims.

In the detailed description above it can be seen that different features are grouped together in examples. This manner of disclosure should not be understood as an intention that the claimed examples have more features than are explicitly mentioned in the respective claim. Rather, the disclosure may include fewer than all features of an individual example disclosed. Therefore, the following claims should hereby be deemed to be incorporated in the description, wherein each claim by itself can stand as a separate example. Although each claim by itself can stand as a separate example, it should be noted that although a dependent claim can refer in the claims to a specific combination with one or one or more claims, other examples can also encompass or include a combination of said dependent claim with the subject matter of any other dependent claim or a combination of any feature with other dependent and independent claims. Such combinations are proposed herein, unless it is explicitly expressed that a specific combination is not intended. Furthermore, it is also intended that features of a claim can be included in any other independent claim, even if the claim is not directly dependent on the independent claim.

It should furthermore be noted that methods, systems, and apparatus disclosed in the description or in the claims can be implemented by a device comprising means for performing the respective actions and/or functionalities of the methods disclosed.

Furthermore, in some examples, an individual action can be subdivided into one or more sub-actions or contain one or more sub-actions. Such sub-actions can be contained in the disclosure of the individual action and be part of the disclosure of the individual action.

While the foregoing disclosure shows illustrative examples of the disclosure, it should be noted that various changes and modifications could be made herein without departing from the scope of the disclosure as defined by the appended claims. The functions and/or actions of the method claims in accordance with the examples of the disclosure described herein need not be performed in any particular order. Additionally, well-known elements will not be described in detail or may be omitted so as to not obscure the relevant details of the aspects and examples disclosed herein. Furthermore, although elements of the disclosure may be described or claimed in the singular, the plural is contemplated unless limitation to the singular is explicitly stated.

What is claimed is:

1. A method executed by a writer agent to maintain memory coherence, comprising:

obtaining exclusive access to at least one coherence granule of shared memory with respect to one or more other agents;

marking, at the writer agent, completion of a store of the at least one coherence granule prior to receipt of data for the at least one coherence granule from the shared memory, wherein the marking causes snoop responses for the at least one coherence granule to be deferred until after data for the at least one coherence granule is received and modified at the writer agent;

receiving the data from the shared memory for the at least one coherence granule;

storing the data at a local cache of the writer agent; and modifying the data at the writer agent.

2. The method of claim 1, further comprising:

preventing access to the at least one coherence granule at the writer agent by the one or more other agents at least until the data has been modified at the writer agent.

3. The method of claim 1, wherein:

the shared memory comprises system memory, cache memory of a common cache, local cache memory of at least one agent of the one or more other agents, or any combination thereof.

4. The method of claim 1, wherein:

the data received from the shared memory is obtained under control of a home agent.

5. The method of claim 1, wherein:

the at least one coherence granule has a size smaller than a single cache line.

6. A method executed by a writer agent to maintain memory coherence, comprising:

requesting, from a home agent, exclusive access to at least one coherence granule of a shared memory, wherein the shared memory is configured for access to multiple agents;

receiving, from the home agent, an indication that the writer agent has exclusive access to the at least one coherence granule of the shared memory, wherein the indicating causes snoop responses for the at least one coherence granule to be deferred until after data for the at least one coherence granule is received and modified at the writer agent;

indicating, at the writer agent, completion of a store of the at least one coherence granule prior to receiving data stored in the at least one coherence granule of the shared memory;

storing the data received from the shared memory in a local cache of the writer agent; and modifying, at the writer agent, the data stored in the local cache.

7. The method of claim 6, further comprising:

receiving, from the home agent, a snoop request for access to the at least one coherence granule in the local cache by at least one agent of the multiple agents; and responding to the snoop request only after modifying the data stored in the local cache.

8. The method of claim 6, further comprising:

executing, at the writer agent, write operations associated with data stores younger than data stores associated with the at least one coherence granule for which the writer agent has exclusive access.

9. The method of claim 6, wherein:

the at least one coherence granule has a same size as a single cache line.

10. The method of claim 6, wherein:

the at least one coherence granule has a size smaller than a single cache line.

11. The method of claim 6, wherein:

the data received from the shared memory is obtained from a cache of at least one agent of the multiple agents.

12. The method of claim 6, is wherein:

the shared memory comprises system memory, cache memory of a common cache, cache memory of at least one agent of the multiple agents, or any combination thereof.

13. An apparatus comprising a writer agent, wherein the writer agent is configured to:

obtain exclusive access to at least one coherence granule of shared memory with respect to one or more other agents, wherein the shared memory is configured for access by the one or more other agents;

mark completion of a store of the at least one coherence granule prior to receipt of data for the at least one coherence granule from the shared memory, wherein the marking causes snoop responses for the at least one coherence granule to be deferred until after data for the at least one coherence granule is received and modified at the writer agent;

receive the data from the shared memory for the at least one coherence granule;

storing the data received from the shared memory at a local cache of the writer agent; and modifying the data at the writer agent.

14. The apparatus of claim 13, wherein:

obtaining exclusive access to the at least one coherence granule of the shared memory comprises:

requesting, from a home agent, exclusive access to the at least one coherence granule of the shared memory; and receiving, from the home agent, an indication that the writer agent has exclusive access to the at least one coherence granule of the shared memory.

15. The apparatus of claim 13, wherein the writer agent is further configured to:

store the data received from the shared memory in a local cache.

16. The apparatus of claim 13, wherein the writer agent is further configured to:

receive, from a home agent, a snoop request for access to the at least one coherence granule stored in the local cache by at least one agent of the one or more other agents; and respond to the snoop request only after modifying the data stored in the local cache.

17. The apparatus of claim 13, wherein the writer agent is further configured to:

perform write operations associated with data stores younger than data stores associated with the at least one coherence granule for which the writer agent has exclusive access.

18. The apparatus of claim 13, wherein:

the local cache is accessible to at least one of the one or more other agents.

19. The apparatus of claim 13, wherein:

the writer agent is configured to obtain the data from the shared memory under control of a home agent.

20. The apparatus of claim 13, wherein:

the shared memory includes one or more local caches at one or more of the other agents.

21. A writer agent, comprising:

means for obtaining exclusive access to at least one coherence granule of shared memory with respect to one or more other agents;

means for marking, at the writer agent, completion of a store of the at least one coherence granule prior to receipt of data for the at least one coherence granule from the shared memory, wherein the marking causes snoop responses for the at least one coherence granule to be deferred until after data for the at least one coherence granule is received and modified at the writer agent;

means for receiving the data from the shared memory for the at least one coherence granule;

means for storing the data at a local cache of the writer agent; and means for modifying the data at the writer agent.

22. A non-transitory computer-readable medium storing computer-executable instructions that, when executed by a writer agent, cause the writer agent to:

obtain exclusive access to at least one coherence granule of shared memory with respect to one or more other agents;

mark, at the writer agent, completion of a store of the at least one coherence granule prior to receipt of data for the at least one coherence granule from the shared memory;

receive the data from the shared memory for the at least one coherence granule;

store the data at a local cache of the writer agent; and modify the data at the writer agent.

\* \* \* \* \*